United States Patent
Neuner et al.

[11] 3,869,469
[45] Mar. 4, 1975

[54] 7-TRIAZOLYL-3-ARYL COUMARIN COMPOUNDS

[75] Inventors: Otto Neuner; Alfons Dorlars, both of Leverkusen, Germany

[73] Assignee: Bayer Aktiengesellschaft, Leverkusen, Germany

[22] Filed: Feb. 15, 1972

[21] Appl. No.: 226,528

[30] Foreign Application Priority Data
Dec. 10, 1971  Germany............................ 2161343

[52] U.S. Cl.. 260/308 A, 252/301.2 W, 260/310 R, 260/343.2 R
[51] Int. Cl. ........................ C07d 99/04, C09k 1/02
[58] Field of Search ................................ 260/308 A

[56] References Cited
UNITED STATES PATENTS
3,542,689   11/1970   Kirchmayr et al. ............. 260/308 A FOREIGN PATENTS OR APPLICATIONS
478,835   9/1969   Switzerland..................... 260/308 A
1,201,759   8/1970   Great Britain .................. 260/308 A
1,906,662   8/1970   Germany ........................ 260/308 A

*Primary Examiner*—Alton D. Rollins
*Attorney, Agent, or Firm*—Plumley & Tyner

[57] ABSTRACT

Coumarine compounds of the formula

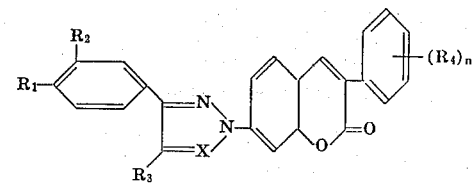

in which
R$_1$ represents a phenyl, phenoxy or benzyloxy radical which is optionally substitued by alkyl, alkoxy, halogen, COOH or alkoxycarbonyl, or represents a cycloalkyl radical,
R$_2$ denotes hydrogen or together with R$_1$ forms a —(CH$_2$)$_4$—radical or —CH=CH—CH=CH— radical,
R$_3$ represents an alkyl radical, a cycloalkyl radical, or a phenyl radical which is optionally substituted by alkyl, alkoxy, halogen, phenyl or cycloalkyl,
R$_4$ denotes hydrogen, halogen, alkoxy, nitrile, COOH or alkoxycarbonyl,
X represents CH or N and
n denotes 1 or 2
as well as their use as brighteners which are incorporated into polyester materials during spinning.

5 Claims, No Drawings

7-TRIAZOLYL-3-ARYL COUMARIN COMPOUNDS

The subject of the present invention are new coumarine compounds of the formula

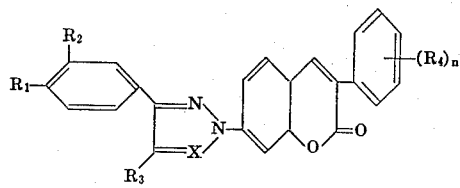

I in which
R₁ represents a phenyl, phenoxy or benzyloxy radical which is optionally substituted by alkyl, alkoxy, halogen, COOH or alkoxycarbonyl, or represents a cycloalkyl radical,
R₂ denotes hydrogen or together with R₁ forms a —(CH₂)₄— radical or —CH=CH—CH=CH— radical,
R₃ represents an alkyl radical, a cycloalkyl radical, or a phenyl radical which is optionally substituted by alkyl, alkoxy, halogen, phenyl or cycloalkyl,
R₄ denotes hydrogen, halogen, alkoxy, nitrile, COOH or alkoxycarbonyl,
X represents CH or N and
n denotes 1 or 2,
as well as their use as brighteners which are incorporated into polyester materials during spinning.

The abovementioned alkyl and alkoxy radicals preferably have 1 – 4 C atoms.

The abovementioned alkoxycarbonyl radicals also preferably have 1 – 4 C atoms in the alkoxy radical, which can be substituted by hydroxyl, C₁—C₄-alkoxy or C₁—C₄-alkoxycarbonyloxy.

Suitable cycloalkyl radicals R₁ and R₃ are, in particular, cyclohexyl radicals.

Possible halogen atoms are above all bromine atoms and chlorine atoms.

Particularly preferred compounds within the framework of the formula I are those in which
R₁ represents phenyl, phenoxy, benzyloxy or cyclohexyl,
R₂ has the abovementioned meaning,
R₃ denotes methyl, ethyl, propyl, isopropyl, phenyl or cyclohexyl, which can be substituted by methyl, chlorine and others,
R₄ denotes hydrogen, methyl, chlorine, nitrile, COOH, methoxy, methoxycarbonyl, ethoxycarbonyl, hydroxyethoxycarbonyl or methoxyethoxycarbonyl and
n denotes the number 1 or 2.

Those compounds of the formula I in which X represents N are obtained in a manner which is in itself known (GB Pat. No. 1,113,918) by dehydration of appropriate oximinohydrazones of the formulae

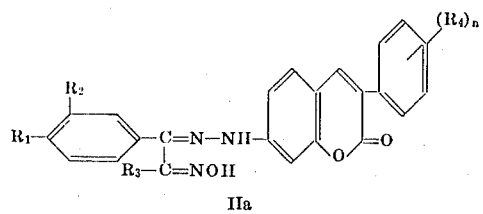

IIa or

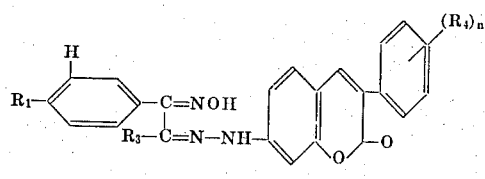

IIb in which
R₁, R₂, R₃, R₄ and n have the meaning mentioned initially.

Those compounds of the formula I in which X represents CH are obtained, for example, in accordance with the method described in BE Pat. No. 741,311 by reaction of 3-aryl-7-(β-acyl- hydrazinocoumarines) with vinylketones of the formula

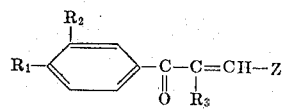

III and subsequent cyclisation of the resulting condensation product.

The new coumarine derivatives are substances which are colourless to pale yellow in colour, which on excitation with UV-light have an intense blue fluouresence and which are outstandingly suitable for brightening polyester spinning compositions. Because of their high heat stability, their low volatility in glycol vapour and their high stability towards the customary esterification catalysts, for example metal salts, the brighteners can, in the manufacture of the polyesters, already be added to the starting components, for example terephthalic acid dimethyl ester and ethylene glycol, before or during the esterification. The compounds of the formula I can also be added during the pre-condensation or during the polycondensation. The process can be carried out continuously or discontinuously. In order to produce delustred polyester materials, 0.1–10 percent of TiO₂, preferably 0.4–4 percent of TiO₂, are added to the starting components.

EXAMPLE 1

6 kg of terephthalic acid dimethyl ester and 5 l of ethylene glycol are mixed, in a 20 l stirred autoclave, with 0.05 percent of zinc acetate and 0.03 percent (relative to terephthalic acid dimethyl ester) of one of the brighteners of the formula (I) listed in Table I under a – s or in Table II under a – i. The autoclave is firstly heated to 180°C whilst stirring at 60 revolutions per minute. The trans-esterification starts at about 150°C. The methanol which has been eliminated is distilled off. After 1 hour, the temperature is raised to 200°C, and after a further 45 minutes it is raised to 220°C. After a total of 2¾ hours the trans-esterification is complete. (Total amount of methanol split off, at least 2.4 l).

For the pre-condensation, the product thus obtained is transferred, under nigrogen, into an autoclave heated to 275°C. During the pre-condensation, the excess glycol is passed directly over a condenser, and collected. After 45 minutes, an initially slight vacuum is applied, which is increased, over the course of a further 45 minutes, to (below) 1 mm Hg. The speed of stirring is at the same time reduced to 40 revolutions per minute. After 2½ hours the polycondensation is complete. The product is subsequently spun in a known manner to give filaments having a final gauge of 50/25 denier. The filaments obtained display excellent brightening together with high fastness to wet processing and to light.

EXAMPLE 2

1,000 parts of polyester granules of poly(terephthalic acid glycol ester) are intimately mixed with 0.3 part of the brightener listed in Example 1 under a – s in Table II under a – i and fused at 285° under a nitrogen atmosphere. The material, spun into filaments in a known manner, displays excellent neutral brightening of very good fastness to light and to washing.

TABLE I

Brighteners of the formula I (X=N)

| Brightener | R₁ | R₂ | R₃ | R₄ | n | Fluorescence in DMF solution |
|---|---|---|---|---|---|---|
| a | —CH=CH—CH=CH— |  | CH₃ | H | 1 | Strongly blue. |
| b | —(CH₂)₄— |  | CH₃ | H | 1 | Strongly reddish-tinged blue. |
| c | —(CH₂)₄— |  | CH₃ | 2,4-Cl₂ | 2 | Reddish-tinged blue. |
| d | —(CH₂)₄— | H |  | H | 1 | Strongly blue. |
| e | —O | H | CH₃ | H | 1 | Do. |
| f | Same as above | H | CH₃ | 4-CH₃ | 1 | Do. |
| g | —CH₂O | H | CH₃ | H | 1 | Do. |
| h |  | H | CH₃ | H | 1 | Strongly reddish-tinged blue. |
| i | Same as above | H | CH₃ | 4-OCH₃ | 1 | Strongly blue. |
| k | do | H | CH₃ | 4-COOCH₂CH₂OCH₃ | 1 | Do. |
| l | do | H | C₂H₅ | H | 1 | Strongly reddish-tinged blue. |
| m | do | H |  | H | 1 | Strongly blue. |
| n | do | H |  | H | 1 | Strongly reddish-tinged blue. |
| o |  | H | CH₃ | H | 1 | Do. |
| p | Same as above | H | CH₃ | 4-CH₃ | 1 | Strongly blue |
| q | do | H | CH(CH₃)₂ | 4-CH₃ | 1 | Strongly reddish-tinged blue. |
| r | do | H | CH₃ | 4-COOC₂H₅ | 1 | Strongly blue. |
| s | do | H | CH₃ | 3-CN | 1 | Do. |

TABLE II

Brighteners of the formula I (X=CH)

| Brightener | R₁ | R₂ | R₃ | R₄ | Fluorescence in DMF solution |
|---|---|---|---|---|---|
| a | —CH=CH—CH=CH— |  | CH₃ | H | Strongly blue. |
| b | —CH=CH—CH=CH— |  |  | H | Strongly reddish-tinged blue. |
| c | —(CH₂)₄— |  | CH₃ | H | Somewhat reddish-tinged blue. |
| d | —(CH₂)₄— |  |  | H | Reddish-tinged blue. |
| e |  | H | CH₃ | H | Strongly blue. |
| f | Same as above | H | C₂H₅ | H | Do. |
| g | do | H |  | H | Reddish-tinged blue. |
| h |  | H | CH₃ | H | Strongly blue. |
| i | Same as above | H |  | H | Do. |

What is claimed is:
1. Coumarine compounds of the formula

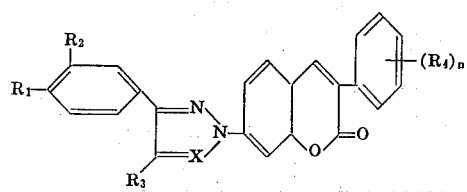

in which
R$_1'$ represents phenyl, phenoxy, benzyloxy or cyclohexyl;
R$_2'$ denotes hydrogen or together with R$_1'$ forms a —(CH$_2$)$_4$—radical or —CH=CH—CH=CH—radical,
R$_3'$ denotes methyl, ethyl, propyl, isopropyl, phenyl or cyclohexyl which can be substituted by methyl or chlorine;
R$_4'$ denotes hydrogen, methyl, chlorine, nitrile, COOH, methoxy carbonyl, ethoxy carbonyl, hydroxy ethoxy carbonyl or methoxy ethoxy carbonyl;
n represents the number 1 or 2 and
X is N.

2. Coumarine compound of the formula

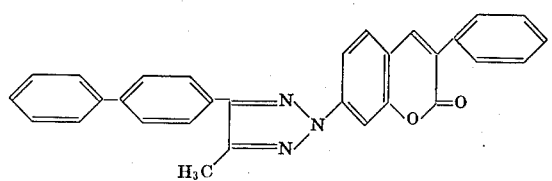

3. Coumarine compound of the formula

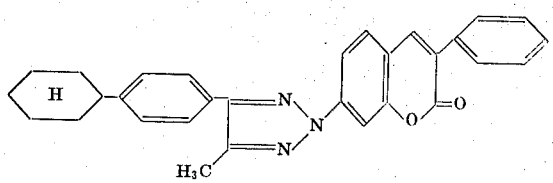

4. Coumarine compound of the formula

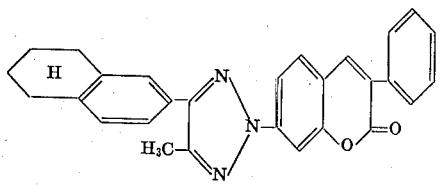

5. Coumarine compound of the formula

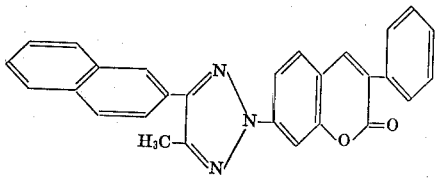

* * * * *